(No Model.)

C. D. ELLIOTT.
HARNESS.

No. 412,078. Patented Oct. 1, 1889.

Witnesses:
T. C. Brecht
Geo. H. Rea

Inventor:
Charles D. Elliott,
By James L. Norris
Attorney.

UNITED STATES PATENT OFFICE.

CHARLES D. ELLIOTT, OF WILSONBURG, WEST VIRGINIA.

HARNESS.

SPECIFICATION forming part of Letters Patent No. 412,078, dated October 1, 1889.

Application filed June 10, 1889. Serial No. 313,722. (No model.)

*To all whom it may concern:*

Be it known that I, CHARLES D. ELLIOTT, a citizen of the United States, residing at Wilsonburg, in the county of Harrison and State of West Virginia, have invented new and useful Improvements in Harness for Preventing Horses from Jumping, Running Away, Kicking, &c., of which the following is a specification.

This invention has for its object to provide novel, simple, and safe harness for preventing horses and other animals from kicking, jumping fences, or running away; and to such end the invention consists, essentially, in the combination of two parallel side straps adapted to extend longitudinally along the opposite sides of the animal and provided with adjustable end loops to encircle the arms of the fore legs and the stifle-joints, a girth-strap secured to the side straps adjoining the fore-leg loops to encircle the body directly behind the fore legs and be buckled under the body, a flank-strap secured to the side straps to encircle the flanks and be buckled under the body directly in advance of the sheath of the animal or dirictly in advance of the stifle-joints, and hip or loin straps secured to the top central part of the flank-strap and diverging toward and secured to the loops of the parallel side straps that encircle the stifle-joints for sustaining such loops in correct position, so that they are not liable to assume positions that would injure the animal by abrading or cutting the skin.

The invention is illustrated by the accompanying drawings, in which—

Figure 1:
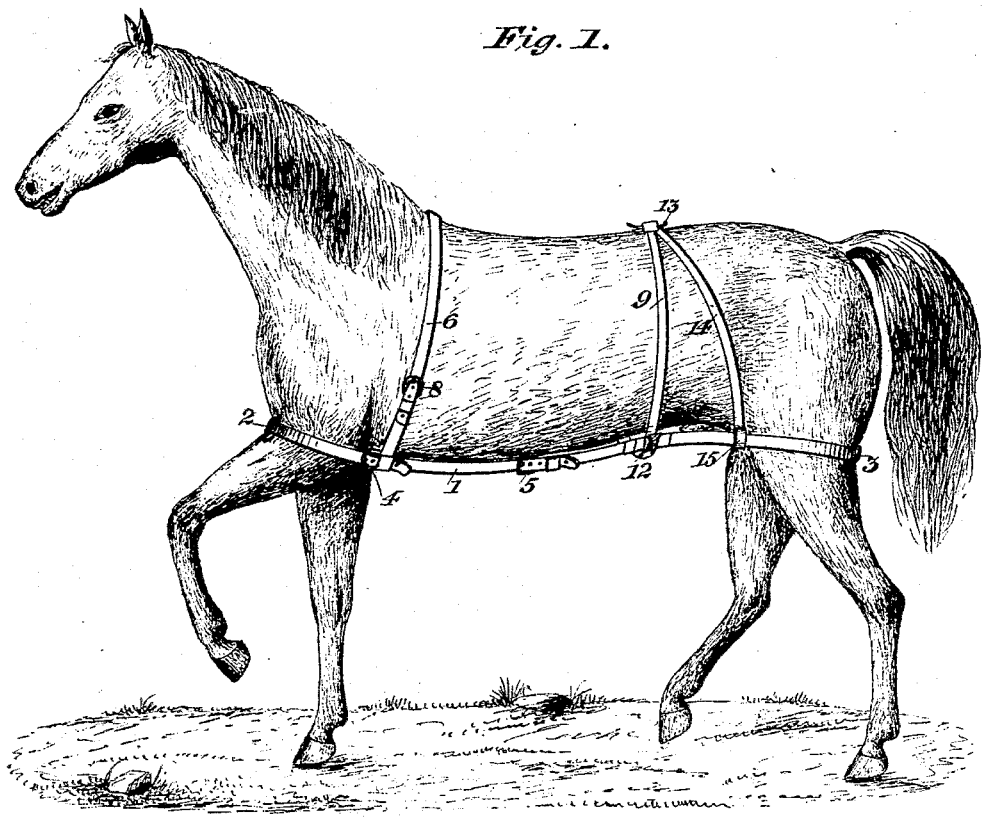
Figure 2:
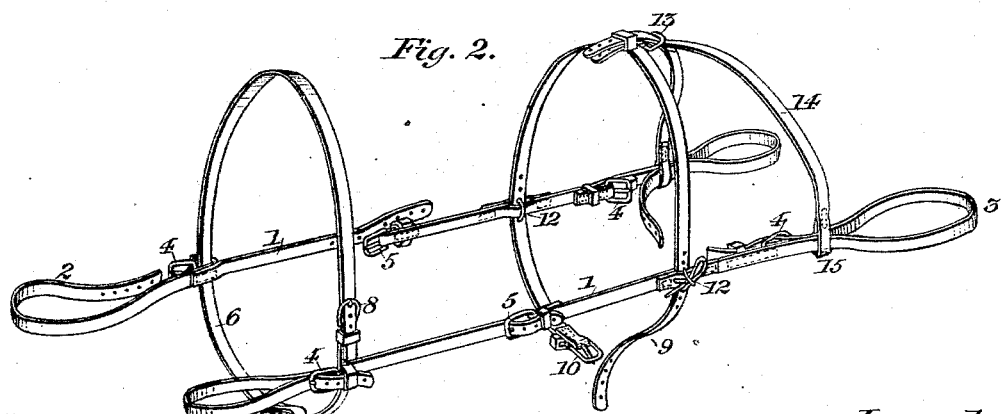

Figure 1 is a perspective view showing the harness applied to an animal, and Fig. 2 is a detail perspective view of the harness.

In order to enable those skilled in the art to make and use my invention, I will now describe the same in detail, referring to the drawings, wherein—

The numerals 1 1 indicate two parallel, or substantially parallel, side straps adapted to extend along the opposite sides of a horse or other animal, and each having at one end a loop 2 to encircle the arm of the fore leg near the shoulder, and at the other end a loop 3 to encircle the rear leg at or about the stifle-joint, each loop being adjustable, as by a buckle 4, to fit the same to animals varying in size. The side straps are made in sections, adjustably united, as by buckles 5, to vary the distance between the fore leg and the stifle-joint loops, as occasion may demand.

A girth-strap 6 is secured at opposite sides to the fore-leg loops 2 and encircles the body directly in rear of the fore legs, its ends extending below the side straps and adjustably connected under the body of the animal, as by a buckle 7. The girth-strap is also provided with a buckle 8, above one of the fore-leg loops, for the purpose of varying the height of such loops on the fore leg and for fitting the parts to animals of varying height or size. A flank-strap 9 is secured at the opposite sides to the side straps 1, and is adapted to pass around the flanks directly in advance of the sheath of the animal or in advance of the rear legs, said flank-strap also extending below the side straps and having a buckle 10 to secure its ends beneath the animal. The flank-strap is adjustably secured to the side straps, as by strings or cords and loop 12, for the purpose of vertically adjusting such side straps and their stifle-joint loops 3 to suit animals of varying size and height.

To the central top portion of the flank-strap are adjustably secured, by a buckle 13, the hip or loin-straps 14, which diverge from said buckle and pass down to the stifle-joint loops 3, where they are connected, as at 15, for the purpose of sustaining the said loops in correct position and preventing them from assuming positions that would be liable to abrade or cut the animal. The buckle which connects the hip or loin straps to the flank-strap serves to lengthen and shorten the hip-straps for raising or lowering the rear loops 3 as circumstances require. The buckles 5, connecting the sections of the side straps, are placed between the girth and flank straps, so that the latter are moved toward or from each other by simply adjusting the side straps to shorten or lengthen them.

By means of the girth and flank straps encircling the body of the animal and buckled beneath the same, as shown, the side straps are firmly held in correct position at the opposite sides of the animal, while by fastening the girth and flank straps firmly to the side straps and providing each fore-leg loop and stifle-joint loop with its independent buckle the size of the loops can be adjusted without affecting or changing the length of the side straps between the girth and flank straps.

Having thus described my invention, what I claim is—

1. The herein-described harness, comprising two parallel side straps having an adjustable independent loop at each end, the girth and the flank straps secured to the side straps, extending below the same, and provided between the side straps with buckles for buckling them beneath the body of an animal at points respectively behind the fore legs and in front of the sheath, and the hip or loin straps diverging from the top part of the flank-strap and secured, respectively, at their lower ends to the rear loops of the side straps, substantially as described.

2. The herein-described harness, consisting of the two parallel side straps, each composed of two sections having front and rear independent loops, the girth and the flank straps adjustably connected with the side straps, extending below the same, and having buckles between said side straps for buckling them beneath the body of the animal at points respectively behind the fore legs and in front of the sheath, the buckles connecting the sections of the side straps between the girth and flank straps for adjusting the latter to and from each other, and the hip or loin straps adjustably secured to and diverging from the top part of the flank-strap and connected, respectively, at their lower ends to the rear loops of the side straps, substantially as described.

In testimony whereof I have affixed my signature in presence of two witnesses.

CHARLES D. ELLIOTT.

Witnesses:
F. M. HARBERT,
C. W. LYNCH.